US008270494B2

(12) United States Patent
Cao et al.

(10) Patent No.: US 8,270,494 B2
(45) Date of Patent: Sep. 18, 2012

(54) VIDEO CONCATENATION FOR MPEG-4 AND H.263 BIT STREAMS

(75) Inventors: Jiangen Cao, Dublin, CA (US); Yanying Sun, Shanghai (CN); Hanguang Dan, Shanghai (CN); Sheng Han, HangZhou (CN); Yingfeng Su, Sunnyvale, CA (US); Congxiu Wang, Shanghai (CN)

(73) Assignee: ArcSoft, Inc., Fremont, CA (US)

( * ) Notice: Subject to any disclaimer, the term of this patent is extended or adjusted under 35 U.S.C. 154(b) by 1010 days.

(21) Appl. No.: 12/185,071

(22) Filed: Aug. 2, 2008

(65) Prior Publication Data

US 2009/0285307 A1    Nov. 19, 2009

Related U.S. Application Data

(60) Provisional application No. 61/127,724, filed on May 14, 2008.

(51) Int. Cl.
*H04N 11/02* (2006.01)
(52) U.S. Cl. ................................. 375/240.23
(58) Field of Classification Search ............. 375/240.01, 375/240.23, 240.26, 240.28; 386/278, 283, 386/284
See application file for complete search history.

(56) References Cited

U.S. PATENT DOCUMENTS

2006/0203920 A1* 9/2006 Yongfang et al. ........ 375/240.28
2009/0201985 A1* 8/2009 Ramanzin ................ 375/240.01

OTHER PUBLICATIONS

S. Dogan et al., "Tandeming/Transcoding Issues Between MPEG-4 and H.263," in M. Ruggieri (Ed.): Mobile and Personal Satellite Communications 3-Proceedings of the 3rd European Workshop on Mobile/Personal Satcoms (EMPS 1998), Springer-Verlag, Great Britain, 1999, ISBN: 1-85233-045-7, pp. 339-346. [c], 10 pages.
Mehdi Jafari et al., "An Efficient Video Transcoding Algorithm Between H.263 and MPEG-4 for Inter-Network Communications," 4 pages.
S. Dogan et al., "Efficient MPEG-4/H/263 video transcoder for interoperability of heterogeneous multimedia networks," Electronics Letters, May 27, 1999, vol. 35, No. 11, 2 pages.

* cited by examiner

*Primary Examiner* — Frank Duong
(74) *Attorney, Agent, or Firm* — Patent Law Group, LLP; David C. Hsia (57) ABSTRACT

A method for concatenating MPEG-4 or H.263 segments is provided. The method includes extracting and comparing the VOL or picture header information of each segment. If the two segments have the same VOL or picture header information, the method merges the two segments directly by appending one segment to another to form a new bit stream. If the two segments have the different resolution, the method completely decodes and re-encodes the segments and then merges the segments. Otherwise the method takes the VOL or picture header information of one segment as reference to produce the new bit stream. The method parses the other segment frame at a time, re-encapsulates it according to the reference VOL or picture header information, and appends it to the one segment. During the process, the method only uses VLD to parse the other segment without using the tools of DCT, IDCT, ME, and MC.

16 Claims, 4 Drawing Sheets

VIDEO CONCATENATION FOR MPEG-4 AND H.263 BIT STREAMS

CROSS REFERENCE TO RELATED APPLICATIONS

This application claims the benefit of U.S. Provisional Application No. 61/127,724, entitled "Video Editing Scheme For MPEG4 and H.263 Streams," filed on May 14, 2008, which is incorporated herein by reference.

FIELD OF INVENTION

This invention relates to editing of videos, and more specifically to editing MPEG-4 and H.263 bit streams.

DESCRIPTION OF RELATED ART

With the advancement of technology, there are more and more handheld devices that can playback multimedia content. Examples of these handheld devices include digital photo cameras, digital video cameras, and smart phones that can capture photos and videos. As these multimedia files are large, the Moving Picture Experts Group (MPEG) and the International Telecommunication Union (ITU) have developed and evolved a series of standards (MPEG-1, MPEG-2, MPEG-4, H.261, H.263, and H.264) to provide methods to represent digital video and signals in a compressed form.

Video content creation and production have reached the masses, as almost everyone is now able to create video clips on a daily basis. Video editing is a natural and necessary operation that is most commonly employed by users after video capture. Wireless imaging and video capturing devices, with hardware constraints on memory and processing power, are unable to accommodate conventional spatial domain video editing.

Manipulation of video sequences has become increasingly popular and various methods have been proposed to edit MPEG bit streams. For example, a simple way to edit a MPEG bit stream is to decode all segments, edit the segments, and then re-encode the edited decompressed frames into a new MPEG bit stream. However, this approach has major drawbacks in that (1) it is computational and resource intensive, and (2) there are accumulated quality losses associated with multiple editing. To decode all the segments, it is necessary to add a decoder. If the segments are from multiple bit streams of different standards, like MPEG-4 and H.263, then decoders of multiple standards have to be included in the editing system to decode all the segments. Furthermore, the segments are edited in the form of raw data (YUV image). Following the editing, the encoder encodes the raw data to be one bit stream. The process is both memory and processor intensive. Thus, what is needed is a method that provides video editing without the above drawbacks.

SUMMARY

In accordance with the invention, a method for concatenating at least two video bit segments includes parsing headers from the two segments and comparing them to determine how the segments are processed. When appropriate, the segments are directly combined or only parsed, re-encapsulated, and then combined without performing inverse discrete cosine transform (IDCT) and motion compensation (MC) during a complete decoding, and motion estimation (ME), MC, and discrete cosine transform (DCT) during a complete re-encoding. Thus, the method is computationally efficient and saves memory, and it avoids accumulated quality losses from complete decoding and re-encoding.

In one embodiment, the segments each conform to the MPEG-4 or the H.263 standard. When the two segments have the same video object layer (VOL) or picture header information, they are directly merged. When the header information indicates the two segments have different resolutions, one segment is completely decoded and re-encoded, and the two segments are merged. Otherwise one segment is taken as the reference and the other segment is parsed frame by frame, re-encapsulated according to the header information of the reference segment, and the two segments are merged. When the non-reference segment is parsed, MC and IDCT are avoided. When the non-reference segment in re-encapsulated, ME, MC, and DCT are avoided.

BRIEF DESCRIPTION OF THE DRAWINGS

Use of the same reference numbers in different figures indicates similar or identical elements.

DETAILED DESCRIPTION OF THE INVENTION

Figure 1:
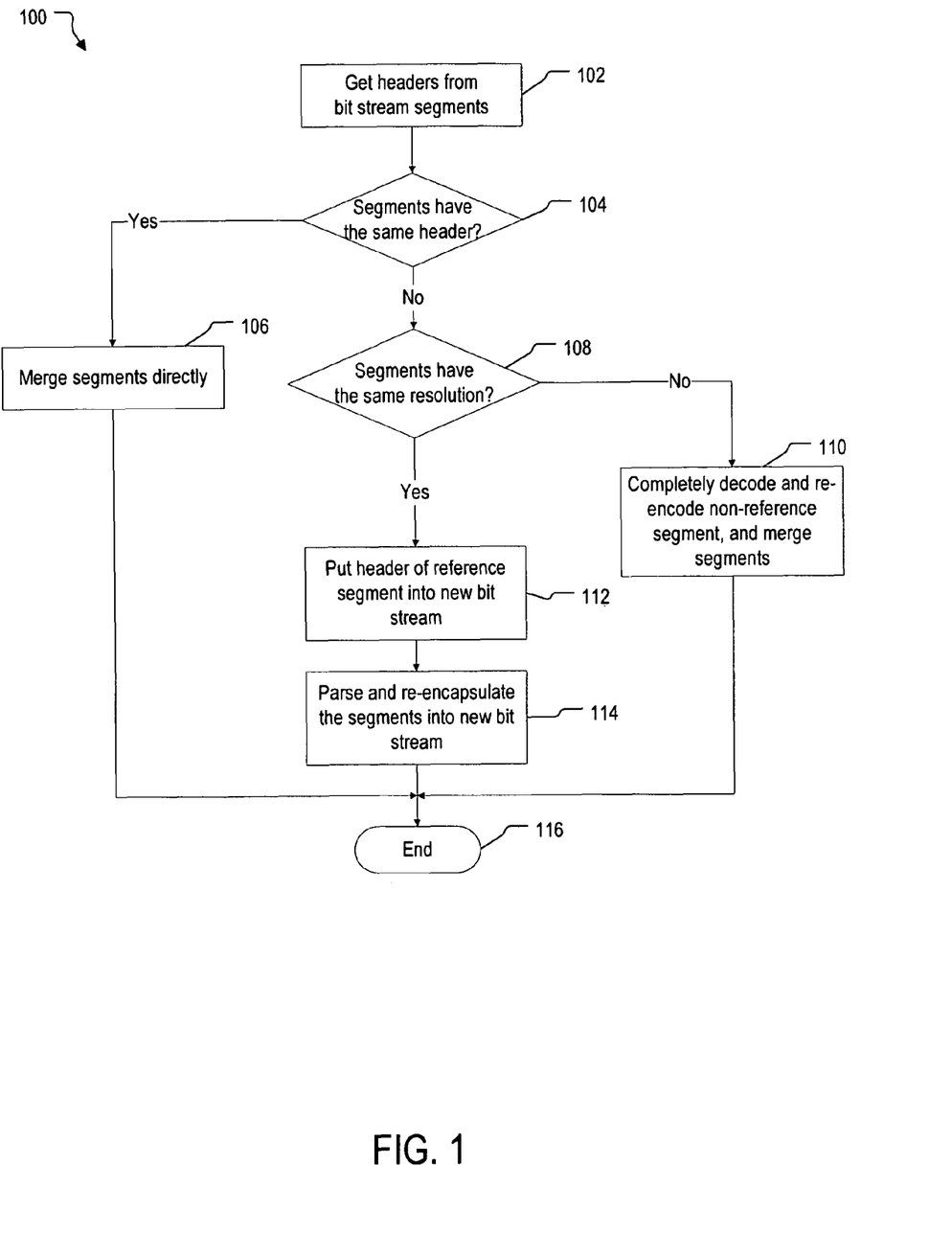
FIG. 1 is a flowchart of a method to for editing MPEG-4 or H.263 bit stream segments in one embodiment of the invention.
Figure 3:
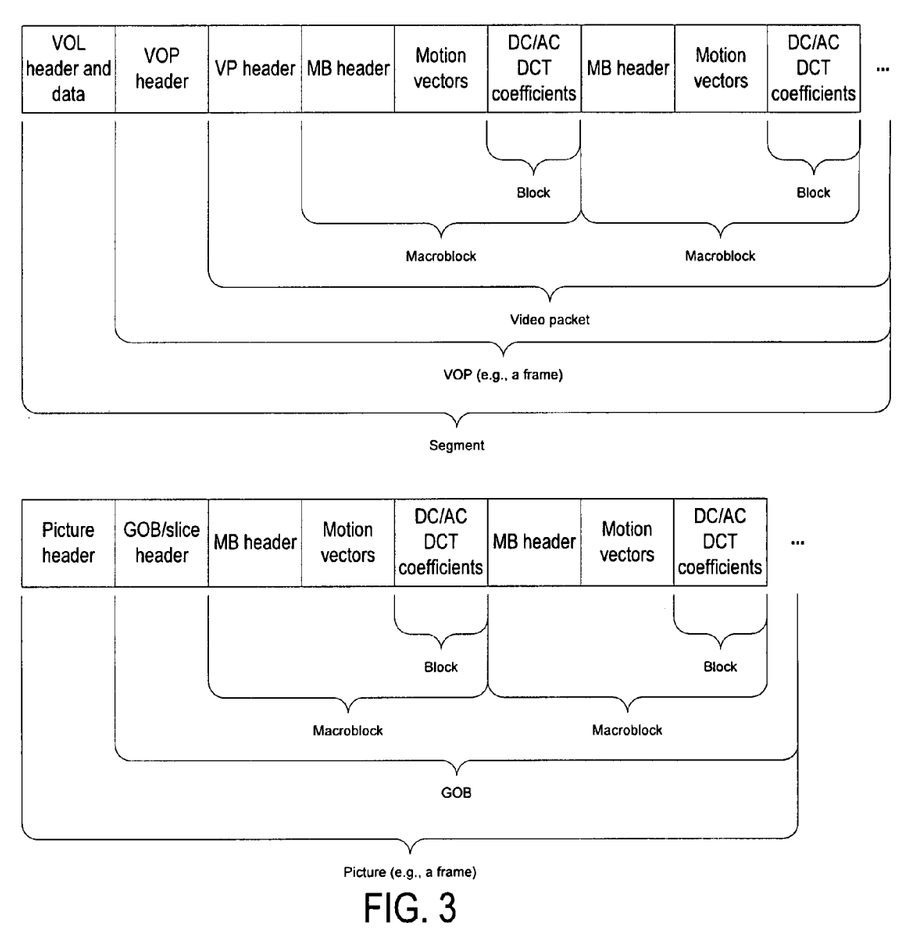
FIG. 3 is a diagram illustrating MPEG-4 and H.263 bit stream segments.

FIG. 1 is a flowchart of a method 100 for concatenating at least two bit stream segments to form a new bit stream in accordance with the invention. Method 100 can be implemented as software loaded from memory and executed by a processor in a handheld device. Typically the two segments are cut from longer MPEG-4 or H.263 bit streams. A segment is a portion of the bit stream that is syntax-complete so it can be decoded correctly by itself. The user can select one of the two segments as the reference segment and the new bit stream would conform to the same standard and configuration as the reference segment. FIG. 3 shows exemplary syntax of H.263 and MPEG-4 bit stream segments. In one embodiment, method 100 applies to H.263 baseline profile and MPEG-4 simple profile.

Referring back to FIG. 1, in step 102, the processor parses the segments for headers. Specifically, the processor looks for a start code in each segment that indicates (1) the start of a header and (2) the standard of the stream. The start code of a visual object layer (VOL) header in a MPEG-4 bit stream has a hexadecimal value of 0x000001, and the start code of a picture header in a H.263 bit stream has a hexadecimal value of 0x00008. When a segment is an MPEG-4 segment, the processor extracts a VOL header from the stream according to the MPEG-4 syntax. When a segment is a H.263 segment, the processor extracts a picture header from the stream according to the H.263 syntax. The processor analyzes each header for syntax elements that identify the coding tools and the coding configurations.

In step 104, the processor determines if the extracted headers are exactly the same. When the headers are exactly the same, the segments can be combined directly since the segments were created with the same coding tools and have the same coding configurations. When the processor determines the headers are exactly the same, step 104 is followed by step 106. Otherwise step 104 is followed by step 108.

In step 106, the processor directly combines the two segments by appending one segment to the end of the other in the order specified by the user to form the new bit stream. Step 106 is followed by step 116, which ends method 100.

In step 108, the processor determines if the two segments have frames of the same resolution. A rectangular frame is represented by a video object plane (VOP) in the MPEG-4 standard. The resolution of VOPs in a MPEG-4 bit stream is identified by the syntax elements video_object layer width and video_object layer height in the VOL header. A rectangular frame is represented by a picture in the H.263 standard. The resolution of a picture in an H.263 bit stream is identified by the syntax element PTYPE in the picture header. If the two segments have frames of the same resolution, step 108 is followed by step 110. Otherwise step 108 is followed by step 112.

In step 110, the processor completely decodes the non-reference segment and completely re-encodes it according to the header information of the reference segment. The processor then merges the segments by appending one segment to the end of the other in the order specified by the user to form the new bit stream. Step 110 is followed by step 116, which ends method 100.

In optional step 112, when the new bit stream is a MPEG-4 stream, the processor puts the VOL header of the reference segment into the new bit stream as its header. Step 112 is followed by step 114.

In step 114, the processor parses the non-reference segment and re-encapsulates the segment according to the header information of the reference segment (or new bit stream). Here, re-encapsulation is the encoding of the DCT coefficients and motion vector information obtained from parsing the streams according to standard syntax. Re-encapsulation does not involve using the decoding tools of motion compensation (MC) and inverse discrete cosines transformation (IDCT) to completely decode the segment to YUV images, and re-encapsulating does not involve using the encoding tools of motion estimation (ME), MC, and discrete cosine transformation (DCT) to complete re-encoding the YUV images. One embodiment of the parsing and re-encapsulating is described later in reference to methods illustrated in FIGS. 2A, 2B, and 2C. The processor then merges the segments by inserting the segments into the new bit stream in the order specified by the user. Step 114 is followed by step 116, which ends method 100.

It is possible for the processor to combine segments of different formats (e.g., H.263 and MPEG-4) by simply parsing and re-encapsulating because the encoding and the decoding tools of the two standards are very similar. Taking the H.263 baseline profile of operation and the MPEG-4 simple profile as an example, the group of blocks (GOB) and the slice structure tools in the H.263 standard are similar to the resynchronization marker tool in the MPEG-4 standard, and the advanced INTRA coding profile in H.263 is similar to the intra coding profile in MPEG-4. An example process for transcoding an H.263 bit stream into a MPEG-4 bit stream can be accomplished as follows.

As the start code of the H.263 picture header and the start code of the MPEG-4 VOL header are different, the first step is to change the H.263 start code into the MPEG-4 start code. The second step is to parse the H.263 picture header information and re-encode the information into MPEG-4 VOL and VOP headers. The third step is to parse the H.263 bit stream frame by frame and re-encode them into MPEG-4 frames because the standards use different AC/DC coefficient prediction tools. For an H.263 intra frame, the AC/DC coefficients are parsed from the H.263 bit stream and then re-encoded into an MPEG-4 intra frame. For an H.263 predicted frame, the differences of motion vectors and the residuals are parsed from the H.263 bit stream and then re-encoded into an MPEG-4 predicted frame. For an H.263 bit stream with GOB or slice headers, they are parsed from the H.263 stream and then re-encoded with MPEG-4 video packet headers with resynchronization markers.

Figure 2A:
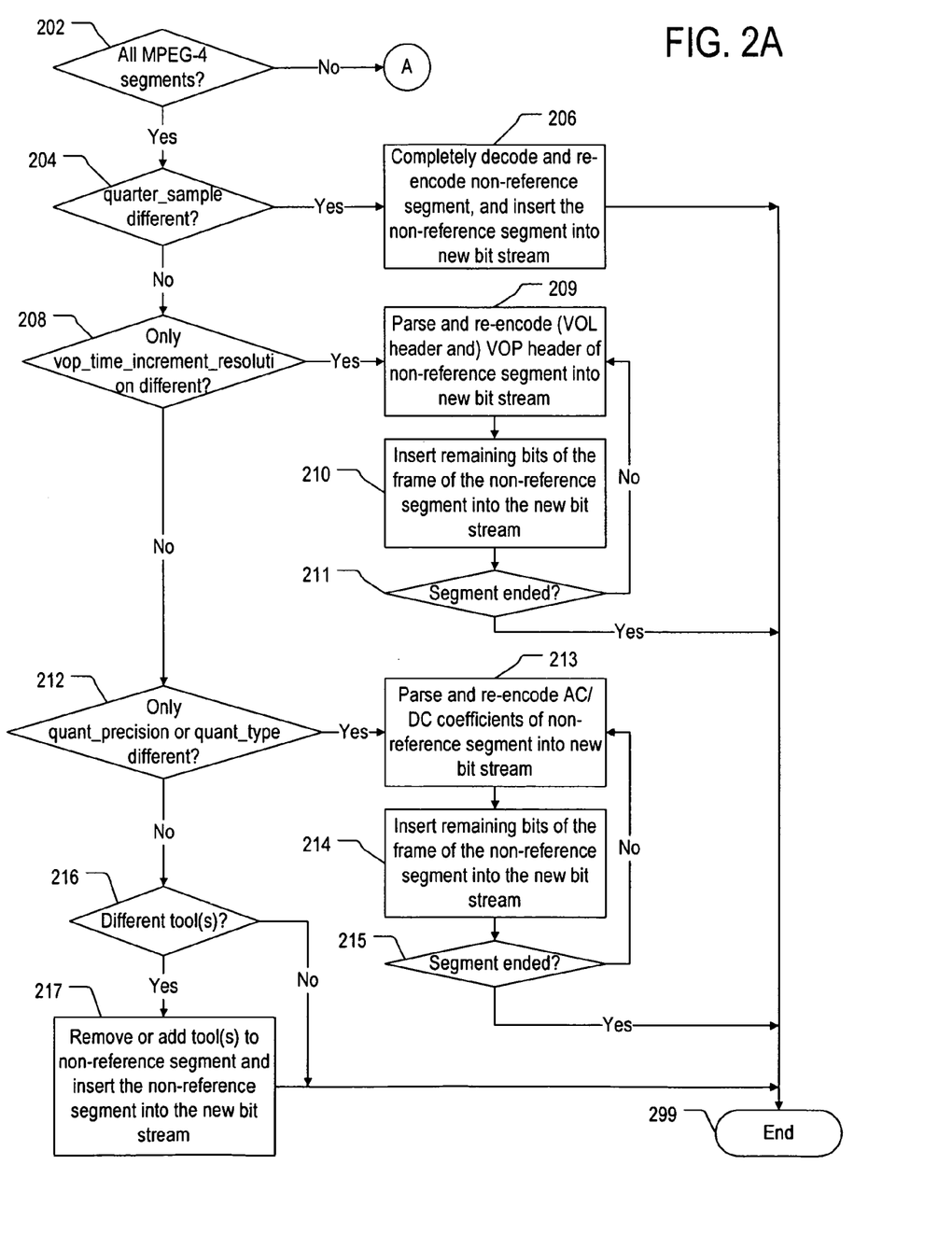
FIGS. 2A and 2B are flowcharts of a step in the method of FIG. 1 in one embodiment of the invention.
Figure 2B:
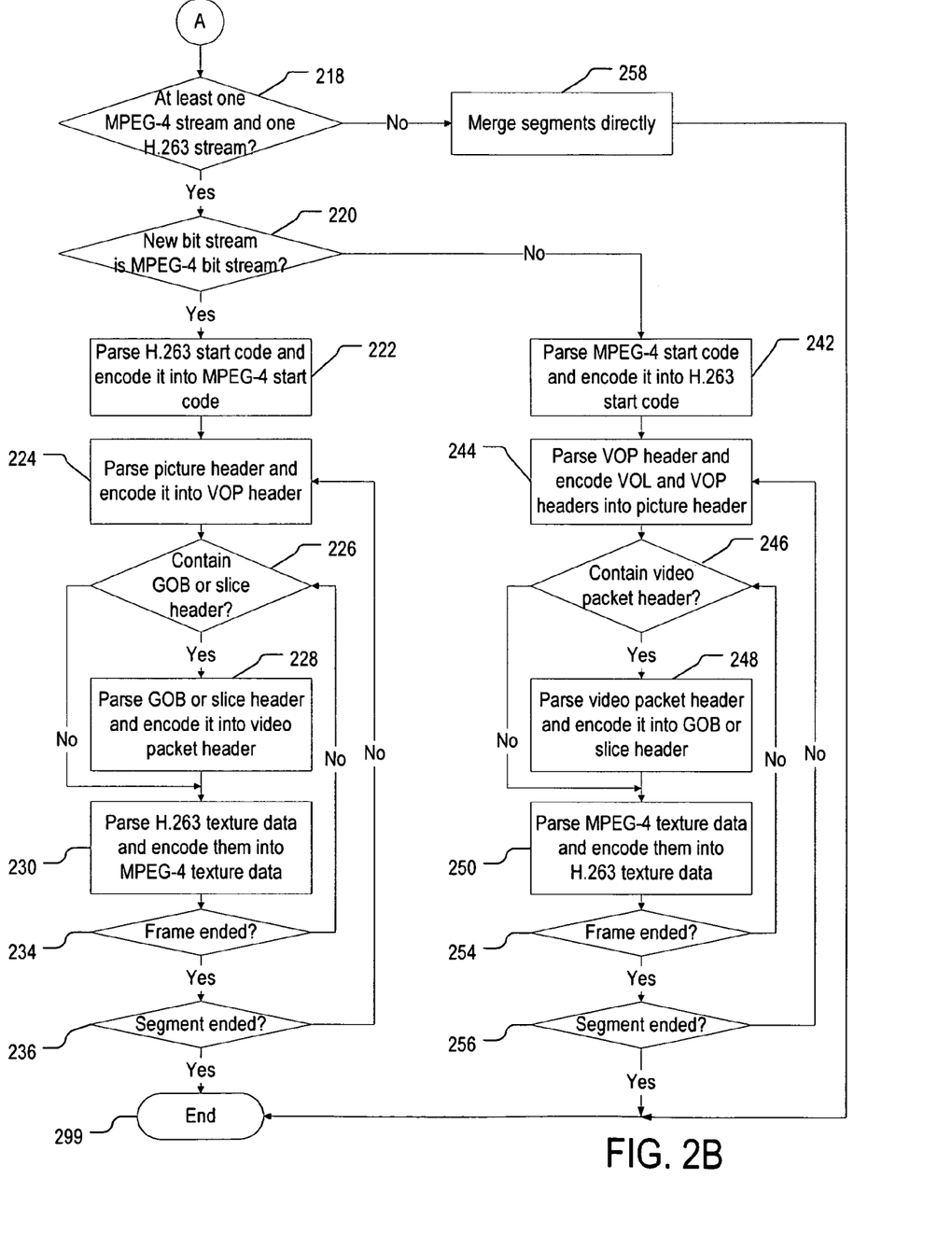

FIGS. 2A and 2B are flowcharts for parsing and re-encapsulating of step 114 in method 100 in one embodiment of the invention. The steps in FIG. 2A are used to process MPEG-4 segments. Steps in FIG. 2B are used to process at least one MPEG-4 segment and at least one H.263 segment.

Referring to FIG. 2A, in step 202, the processor determines if all the segments are MPEG-4 segments. If so, then step 202 is followed by step 204. Otherwise step 202 is followed by step 218 on FIG. 2B.

In step 204, the processor compares the VOL headers of the non-reference segment and the reference segment (or the new bit stream). Specifically, the processor compares a first set of syntax elements indicating MPEG-4 coding configurations, and a second set of syntax elements identifying MPEG-4 coding tools used to create the segment. The first set of syntax elements includes quarter_sample, vop_time_increment_resolution, quant_precision, and quant_type. The second set of syntax elements includes interlaced, obmc_disable, resync_marker_disable, data_partitioned, reversible_vlc, and short_video_header. These syntax elements indicate if the segment include interlaced video, overlapped block motion compensation, resync_marker in each VOP, partitioned macroblock data, reversible variable length tables should be used to decode DCT coefficients, and abbreviated header format.

The processor determines if the values of the syntax element quarter_sample are different between the VOL headers of the reference and the non-reference segments. If so, step 204 is followed by step 206. Otherwise step 204 is followed by step 208.

In step 206, the processor completely decodes the non-reference segment frame by frame and then completely re-encodes the frames according to the VOL header information of the reference segment. The processor then inserts the bits of the non-reference segment into the new bit stream in the order specified by the user (i.e., before or after the reference segment). Step 206 is followed by step 299, which ends step 114.

In step 208, the processor determines if the segments use the same coding tools and only the values of the syntax element vop_time_increment_resolution are different. If so, step 208 is followed by step 209. Otherwise step 208 is followed by step 212.

In step 209, the processor starts to parse the non-reference segment and insert the bits into the new bit stream in the order specified by the user. In a first pass through step 209, the processor finds the VOL header (by recognizing the VOL header start code). In response, the processor re-encodes the value of syntax element vop_time_increment_resolution in the VOL header equal to the value of the same element in the VOL header of the reference segment (or the new bit stream), and inserts the VOL header into the new bit stream.

In all passes through step 209, the processor finds the VOP header of the current frame (by recognizing the VOP header start code). In response, the processor re-encodes the value of syntax element vop_time_increment in the VOP header according to the value of syntax element vop_time_increment_resolution in the VOL header of the reference segment (or the new bit stream), and inserts the VOP header into the new bit stream. Step 209 is followed by step 210.

In step 210, the processor continues to insert the remaining bits of the current frame into the new bit stream. Step 210 is followed by step 211.

In step 211, the processor determines if it has inserted all the frames of the non-reference segment into the new bit stream. If no, then step 211 loops back to 209 to process the next frame in the non-reference segment. Otherwise step 211 is followed by step 299, which ends step 114.

In step 212, the processor determines if the segments use the same coding tools and only the values of one or both of syntax elements quant_precision and quant_type are different. If so, then step 212 is followed by step 213. Otherwise step 212 is followed by step 216.

In step 213, the processor starts to parse the non-reference segment and inserts the bits into the new bit stream in the order specified by the user. When the processor finds the AC/DC coefficients, it decodes the AC/DC coefficients using variable length decoding (VLD), re-encodes the AC/DC coefficients using variable length encoding (VLC) according to the value of syntax elements quant_precision or quant_type in the VOL header of the reference segment (or the new bit stream), and inserts the AC/DC coefficients into the new bit stream. Step 213 is followed by step 214.

In step 214, the processer continues to insert the remaining bits of the current frame into the new bit stream. Step 214 is followed by step 215.

In step 215, the processor determines if it has inserted all the frames of the non-reference segment into the new bit stream. If no, then step 215 loops back to 213 to process the next frame in the non-reference segment. Otherwise step 215 is followed by step 299, which ends step 114.

In step 216, the processor determines if the segments are created with at least one different coding tool, which is indicated when the values of at least one of the syntax elements of interlaced, obmc_disable, resync_marker_disable, data_partitioned, reversible_vlc, and short_video_header are different. If so, then step 216 is followed by step 217. Otherwise step 216 is followed by step 299, which ends step 114.

When one segment is created with a coding tool and the other is not, one of the segments has to be modified as the segments are combined under the preconditions of the same VOL header information. There are two ways to do this: one is removing the coding tool from the non-reference segment and the other is adding the coding tool to the non-reference segment.

For example, assume the non-reference segment is created with the data partition tool that partition macroblock data into two parts and the reference segment is not. The processor can remove the data partition from the non-reference segment. This requires parsing the VOL header of the first segment, re-encoding the VOL header to indicate that data partitioning is not used, inserting the VOL header into the new bit stream, parsing the macroblock data (e.g., the MB header and the residual data for a predicted VOP), re-encoding the macroblock data (e.g., removing the motion markers and rearranging the MB header and the residual data), and inserting the macroblock data into the new bit stream. Particular attention is paid to the parsing process as the MB header and the residual data conform to the syntax with data partitioning, and the re-coding process has to rearrange the MB header and the residual data so they conform to the syntax without data partitioning.

For example, assume the reference segment is created with the resynchronization marker tool and the first segment is not. The processor can insert the resynchronization markers into the non-reference segment at the appropriate locations.

In step 217, the processor parses the non-reference segments, re-encodes the segments by either removing or adding the coding tools while making sure the resulting segments conform to the MPEG-4 syntax, and inserts the non-reference and the reference segments into the new bit stream in the order specified by the user. Step 217 is followed by step 299, which ends step 114.

Referring to FIG. 2B, in step 218, the processor determines if at least one segment conforms to MPEG-4 standard and at least one segment conforms to H.263 standard. If so, step 218 is followed by step 220. Otherwise step 218 is followed by step 258.

In step 220, the processor determines if the new bit stream is set to conform to MPEG-4 or H.263 standard. The new bit stream is set to conform to MPEG-4 when the user selects a MPEG-4 segment as the reference segment, and the new bit stream is set to conform to H.263 when the user selects a H.263 segment as the reference segment. If the new bit stream is to conform to MPEG-4 standard, step 220 is followed by step 222. If the new bit stream is to conform to H.263 standard, step 220 is followed by step 242.

In step 222, the processor starts to parse the non-reference segment and insert the bits of into the new bit stream in the order specified by the user (i.e., before or after the reference segment). When the processor finds a start code for a picture header, it re-encodes the start code to a start code for a VOL header and inserts the start code into the new bit stream. Step 222 is followed by step 224.

In step 224, when the processor finds a picture header for a frame, it re-encodes the picture header into a VOP header and inserts the VOP header into the new bit stream. Note that the processor extracts various syntax elements, including TR, PQUANT, CPM, PEI, PLUSTYPE, UFEP, and OPPTYPE, to transcode the H.263 segment into a MPEG-4 segment. Step 224 is followed by step 226.

In step 226, the processor determines if it finds a GOB or a slice header. If the processor finds the GOB or the slice header, then step 226 is followed by step 228. Otherwise step 226 is followed by step 230.

In step 228, the processor re-encodes the GOB or the slice header into an MPEG-4 video packet header with a resynchronization marker and inserts the video packet header into the new bit stream. Note that the VOL header for the non-reference segment inserted into the new bit stream may have to be updated to show that the resynchronization marker tool is used. Step 228 is followed by step 230.

In step 230, when the processor finds the H.263 texture data, it re-encodes them into MPEG-4 texture data without MC, ME, IDCT, and DCT, and inserts the MPEG-4 texture data into the new bit stream. This includes using VLD to decode AC/DC coefficients and motion vector differences (MVDs) from the H.263 syntax, and using VLC to re-encodes the AC/DC coefficients and MVDs into the MPEG-4 syntax. Step 230 is followed by step 234.

In step 234, the processor determines if it has inserted all macroblock data of the current frame into the new bit stream based on the resolution of the frame and the number of macroblocks processed. If no, then step 234 loops back to step 226 as there could be GOB or slice headers in between the macroblocks of the current frame. This loop continues until the current frame is completely inserted into the new bit stream. Otherwise step 234 is followed by step 236.

In step 236, the processor determines if it has inserted all the frames of the non-reference segment into the new bit stream. If no, then step 236 loops back to 224 until all the frames of the non-reference segment is completely inserted into the new bit stream. Otherwise step 236 is followed by step 299, which ends step 114.

In step 242, the processor starts to parse the non-reference segment and insert the bits into the new bit stream in the order specified by the user. When the processor finds a start code for a VOP header, it re-encodes the start code to a start code for a picture header and inserts the start code into the new bit stream. Step 242 is followed by step 244.

In step 244, when the processor finds a VOP header for a frame, it re-encodes the VOL and VOP headers into a picture header and inserts the picture header into the new bit stream. Note that the VOL header was parsed earlier in step 102 in FIG. 1. Step 224 is followed by step 226.

In step 246, the processor determines if it finds a video packet header with a resynchronization marker. If the processor finds the video packet header, then step 246 is followed by step 248. Otherwise step 246 is followed by step 250.

In step 248, the processor re-encodes the video packet header into a GOB header or a slice header, and inserts the GOB header or the slice header into the new bit stream. Note that GOB header must be inserted according to the MPEG-4 syntax where as the slice header does not have such a limitation. Step 248 is followed by step 250.

In step 250, when the processor finds the MPEG-4 texture data, it re-encodes them into H.263 texture data without MC, ME, IDCT, and DCT, and inserts the H.263 texture data into the new bit stream. This includes using VLD to decode AC/DC coefficients and MVDs in the MPEG-4 syntax, and using VLC to re-encodes the AC/DC coefficients and MVDs into the H.263 syntax. Step 250 is followed by step 254.

In step 254, the processor determines if it has completely inserted all macroblock data of the current frame into the new bit stream based on the resolution of the frame and the number of marcroblocks processed. If no, then step 254 loops back to step 246 as there could be a video packet header in between the macroblocks of the current frame. This loop continues until all the macroblock data of the current frame is completely inserted into the new bit stream. Otherwise step 254 is followed by step 256.

In step 256, the processor determines if it has inserted all the frames of the non-reference segment into the new bit stream. If no, then step 256 loops back to 244 until all the frames of the non-reference segment is completely inserted into the new bit stream. Otherwise step 256 is followed by step 299, which ends step 114.

In step 258, the processor directly combines the H.263 segments by appending one segment to the end of the other in the order specified by the user to form the new bit stream. Step 258 is followed by step 299, which ends step 114.

Various other adaptations and combinations of features of the embodiments disclosed are within the scope of the invention. Numerous embodiments are encompassed by the following claims.

What is claimed is:

1. A method for concatenating a first segment of a first media standard and a second segment of a second media standard into a new bit stream, each media standard being selected from a MPEG-4 standard and a H.263 standard, the method comprising:
 parsing, using a processor, a header from the first segment and a header from the second segment;
 analyzing, using the processor, the headers;
 when the headers indicate the first and the second segments are both MPEG-4 segments and values of at least one of syntax elements quant_precision and quant_type are different between the headers, using the processor:
  parsing and re-encoding AC and DC coefficients in one segment according to at least one of syntax elements quant_precision and quant_type in the other segment; and
  combining the one segment with the other segment.

2. The method of claim 1, when the headers are exactly the same, appending one segment to the end of the other segment.

3. The method of claim 1, further comprising:
 when the headers indicate the first and the second segments have different resolutions:
 completely decoding one segment down to images;
 completely re-encoding the one segment; and
 combining the one segment with the other segment.

4. The method of claim 1, further comprising:
 when the headers indicate the first and the second segments are both MPEG-4 segments and the headers have different values for a syntax element quarter_sample:
 completely decoding one segment down to images;
 completely re-encoding the one segment; and
 combining the one segment with the other segment.

5. The method of claim 1, wherein combining the one segment with the other segment is performed without motion estimation, motion compensation, discrete cosine transformation, and inverse discrete cosine transformation.

6. The method of claim 1, wherein analyzing the headers includes:
 searching for an MPEG-4 start code and when the MPEG-4 start code is found, extracting syntax elements of vop_time_increment_resolution, video_object_layer_width, video_object_layer_height, interlaced, obmc_disable, quant_precision, quant_type, quarter_sample, resync_marker_disable, data_partitioned, reversible_vlc, short_video_header; and
 searching for an H.263 start code and when the H.263 start code is found, extracting syntax elements of TR, PTYPE, PQUANT, CPM, PEI, PLUSPTYPE, UFEP, and OPPTYPE.

7. The method of claim 6, further comprising:
 when the first and the second segments are both MPEG-4 segments and values of syntax element vop_time_increment_resolution are different between the headers:
 parsing and re-encoding VOL and VOP headers in one segment according to syntax element vop_time_increment_resolution in the other segment; and
 combining the one segment with the other segment.

8. The method of claim 6, wherein step (3) occurs further comprising:
 when the first and the second segments are both MPEG-4 segments and values of at least one of syntax elements interlaced, obmc_disable, resync_marker_disable, data_partitioned, reversible_vlc, short_video_header are different between the headers:
 at least one of adding and removing at least one coding tool from one segment; and
 combining the one segment with the other segment.

9. The method of claim 1, further comprising:
 when the headers indicate one segment is a H.263 segment, the other segment is a MPEG-4 segment, and the new bit stream is a MPEG-4 segment:
 parsing picture header information from the one segment and encoding it into a VOP header; and
 combining the one segment with the other segment.

10. The method of claim 9, further comprising:
when the headers indicate one segment is a H.263 segment, the other segment is a MPEG-4 segment, and the new bit stream is a MPEG-4 segment:
parsing at least one of GOB and slice header information from the one segment and encoding it into a video packet header.

11. The method of claim 10, further comprising:
when the headers indicate one segment is a H.263 segment, the other segment is a MPEG-4 segment, and the new bit stream is a MPEG-4 segment:
parsing H.263 texture data and encoding it into MPEG-4 texture data.

12. The method of claim 11, wherein, when the headers indicate one segment is a H.263 segment, the other segment is a MPEG-4 segment, and the new bit stream is a MPEG-4 segment, combining the one segment with the other segment is performed with variable length decoding and coding, and without motion estimation, motion compensation, discrete cosine transformation, and inverse discrete cosine transformation.

13. The method of claim 1, further comprising:
when one segment is a MPEG-4 segment, the other segment is a H.263 segment, and the new bit stream is a H.263 segment:
further includes parsing VOL and VOP header information and encoding them into a picture header; and
combining the one segment with the other segment.

14. The method of claim 13, further comprising:
when one segment is a MPEG-4 segment, the other segment is a H.263 segment, and the new bit stream is a H.263 segment:
parsing video packet header information and encoding it into one of a GOB header and a slice header.

15. The method of claim 14, further comprising:
when one segment is a MPEG-4 segment, the other segment is a H.263 segment, and the new bit stream is a H.263 segment:
parsing MPEG-4 texture data and encoding it into H.263 texture data.

16. The method of claim 15, wherein, when the one segment is a MPEG-4 segment, the other segment is a H.263 segment, and the new bit stream is a H.263 segment, combining the one segment with the other segment is performed with variable length decoding and coding, and without motion estimation, motion compensation, discrete cosine transformation, and inverse discrete cosine transformation.

* * * * *

UNITED STATES PATENT AND TRADEMARK OFFICE
CERTIFICATE OF CORRECTION

| | | |
|---|---|---|
| PATENT NO. | : 8,270,494 B2 | Page 1 of 1 |
| APPLICATION NO. | : 12/185071 | |
| DATED | : September 18, 2012 | |
| INVENTOR(S) | : Jiangen Cao et al. | |

It is certified that error appears in the above-identified patent and that said Letters Patent is hereby corrected as shown below:

Column 8,
Line 51, Claim 8, where "wherein step (3) occurs" should be omitted.

Column 10,
Line 1, Claim 13, where "further includes" should be omitted.

Signed and Sealed this
Twenty-third Day of October, 2012

David J. Kappos
*Director of the United States Patent and Trademark Office*